United States Patent
Uryu et al.

(10) Patent No.: US 11,222,151 B2
(45) Date of Patent: Jan. 11, 2022

(54) SEB RESISTANCE EVALUATION METHOD AND SEB RESISTANCE EVALUATION DEVICE

(71) Applicant: Mitsubishi Electric Corporation, Tokyo (JP)

(72) Inventors: Katsumi Uryu, Tokyo (JP); Tadaharu Minato, Tokyo (JP); Takahiro Nakatani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/933,038

(22) Filed: Jul. 20, 2020

(65) Prior Publication Data

US 2021/0064796 A1    Mar. 4, 2021

(30) Foreign Application Priority Data

Aug. 27, 2019  (JP) .............................. JP2019-154792

(51) Int. Cl.
| | | |
|---|---|---|
| *G06F 30/20* | (2020.01) | |
| *H01L 29/06* | (2006.01) | |
| *G06F 119/02* | (2020.01) | |
| *H01L 29/739* | (2006.01) | |
| *G06F 117/06* | (2020.01) | |
| *H01L 29/868* | (2006.01) | |

(52) U.S. Cl.
CPC .......... *G06F 30/20* (2020.01); *G06F 2117/06* (2020.01); *G06F 2119/02* (2020.01); *H01L 29/0623* (2013.01); *H01L 29/7397* (2013.01); *H01L 29/868* (2013.01)

(58) Field of Classification Search
CPC .. G06F 30/20; G06F 2117/06; G06F 2119/02; H01L 29/0623; H01L 29/7397; H01L 29/868

See application file for complete search history.

(56) References Cited

U.S. PATENT DOCUMENTS

| | | | |
|---|---|---|---|
| 6,885,063 B2* | 4/2005 | Tagami | H01L 29/7802 257/341 |
| 9,859,448 B2* | 1/2018 | Scarpulla | H01L 29/47 |
| 10,546,951 B2* | 1/2020 | Ren | H01L 29/0623 |

FOREIGN PATENT DOCUMENTS

JP          2004-125633 A       4/2004

OTHER PUBLICATIONS

N. Kaminski and A. Kopta, ABB application note 5SYA 2042-04, "Failure rates of HiPak modules due to cosmic rays" Nov. 2004; pp. 1-10; ABB Switzerland Ltd, Semiconductors; Switzerland.
JEDEC Solid State Tecnology Association; Measurement and Reporting of Alpha Particle and Terrestrial Cosmic Ray-Induced Soft Errors in Semiconductor Devices, JEDEC Standard JESD89A, Aug. 2001.
S. M. Sze, "Physics of Semiconductor Devices," Photodetectors; pp. 754-757, 2nd edition, 1981, A Wiley-Interscience publication.

* cited by examiner

*Primary Examiner* — Pho M Luu
(74) *Attorney, Agent, or Firm* — Studebaker & Brackett PC

(57) ABSTRACT

A SEB resistance evaluation method includes: disposing an excitation source within a model of a semiconductor device; and determining an energy of the excitation source at which the semiconductor device exhibits thermal runaway, while varying a voltage applied to the model of the semiconductor device and the energy of the excitation source.

12 Claims, 13 Drawing Sheets

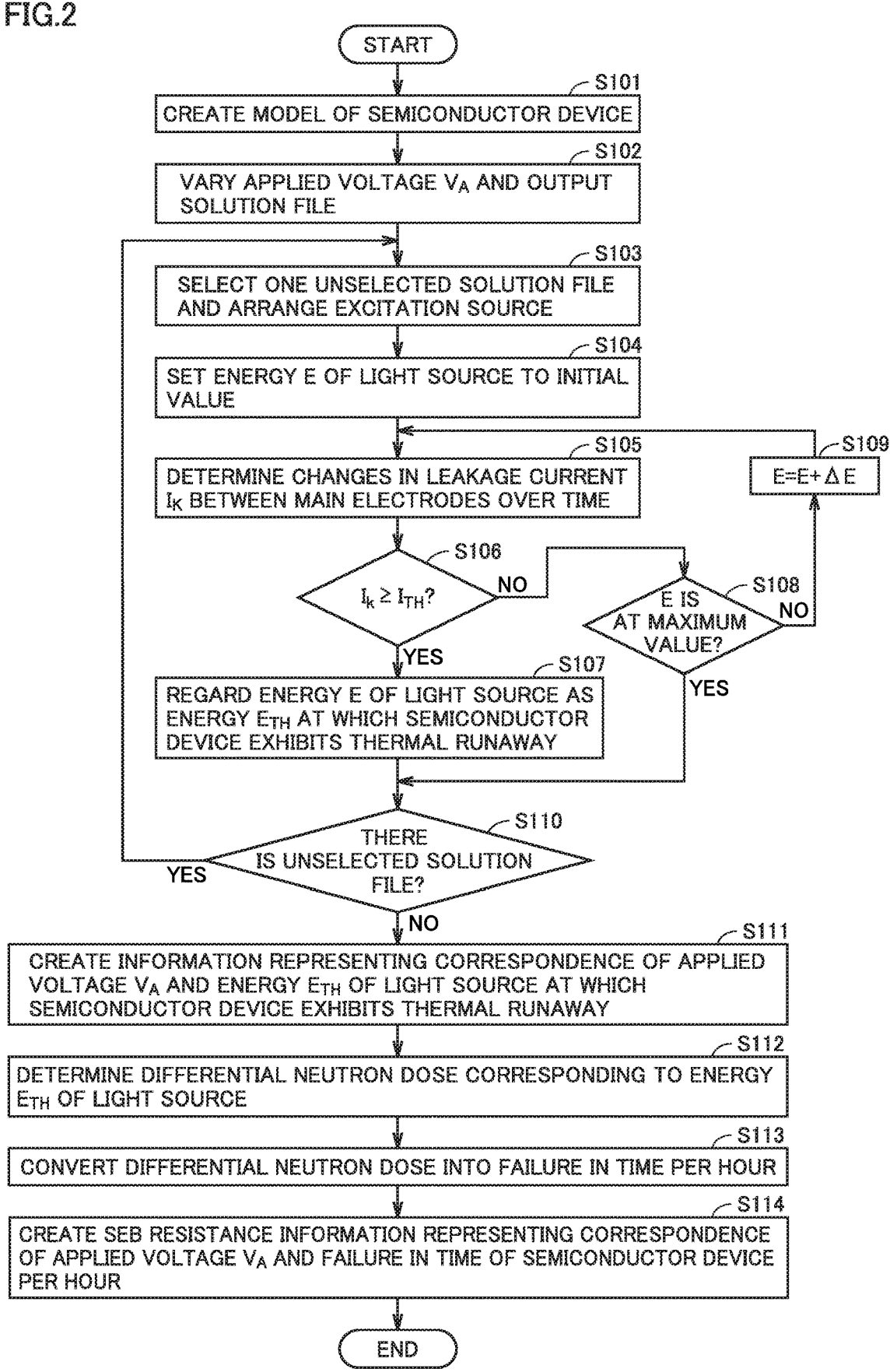

SEB RESISTANCE EVALUATION METHOD AND SEB RESISTANCE EVALUATION DEVICE

BACKGROUND OF THE INVENTION

Field of the Invention

The present disclosure relates to a SEB resistance evaluation method and a SEB resistance evaluation device.

Description of the Background Art

Destruction of a semiconductor device by single-event burnout (SEB) is known in which cosmic rays raining down on the ground causes sudden, permanent destruction of a semiconductor device. The SEB phenomenon is a phenomenon that neutrons passing in the proximity of the Earth's surface produce electron-hole pairs as the neutrons pass through a portion of a semiconductor device, such as a P-N junction, at which a high electric field is held, and electrons or holes are multiplied in a depletion layer (space charge region) and the semiconductor device is lead to breakdown. The SEB resistance refers to resistance of the semiconductor device to SEB.

Conventionally, the SEB resistance of semiconductor device is evaluated by generating radiation using bulky radiation equipment, such as an accelerator, to simulate the neutrons passing in the proximity of the Earth's surface, and measuring the failure rate while the semiconductor device is being irradiated with the radiation.

For example, Japanese Patent Laying-Open No. 2004-125633 discloses a Monte Carlo simulator which analyzes a nuclear reaction of a neutron beam having an arbitrary energy spectrum with an atomic nucleus included in a device, and the behavior of carriers which are collected in a storage node while the secondary ions, resulted from the nuclear reaction, are being scattered within the device. Japanese Patent Laying-Open No. 2004-125633 further discloses improves the accuracy of the simulation by extracting actual experimental data of the semiconductor device through a field test and an accelerator test, using the simulator as the core of the test, thereby converging the actual experimental data of the semiconductor device so that the actual experimental data can be reconstructed with high fidelity.

SUMMARY OF THE INVENTION

The method disclosed in Japanese Patent Laying-Open No. 2004-125633 requires the actual experimental data of a semiconductor device. Accordingly, the method requires large radiation facilities, such as an accelerator, for generating neutrons. The installation and management of the radiation facilities are costly.

Therefore, an object of the present disclosure is to provide a SEB resistance evaluation method and a SEB resistance evaluation device which evaluate the SEB resistance of a semiconductor device, without the use of data obtained through experiment using large radiation facilities, such as an accelerator.

The present disclosure is a SEB resistance evaluation method for evaluating single event burnout (SEB) resistance of a semiconductor device by computer simulation, the method including: disposing an excitation source within a model of the semiconductor device; and determining an energy of the excitation source at which the semiconductor device exhibits thermal runaway, while varying an applied voltage to the model of the semiconductor device and the energy of the excitation source.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 2 is a flowchart representing a procedure for evaluating the SEB resistance of the semiconductor device according to Embodiment 1.

DESCRIPTION OF THE PREFERRED EMBODIMENTS

Hereinafter, embodiments according to the present disclosure will be described, with reference to the accompanying drawings.

Embodiment 1

Reference Example

Reference 1 (N. Kaminski and A. Kopta, ABB application note 5SYA 2042-04, "Failure rates of HiPak modules due to cosmic rays") discloses determining failure probability P ($V_{DC}$, $T_{vj}$, h) of accidental destruction by SEB by Equation (1).

[MATH 1]

$$P(V_{DC}, T_{vj}, h) = C_3 \cdot \exp\left(\frac{C_2}{C_1 - V_{DC}}\right) \cdot \exp\left(\frac{25 - T_{vj}}{47.6}\right) \cdot \exp\left(\frac{1 - \left(1 - \frac{h}{44300}\right)^{5.26}}{0.143}\right) \quad (1)$$

The 1st term on the right hand side of Equation (1) depends on an applied voltage ($V_{DC}$), the 2nd term depends on a temperature ($T_{vj}$) of a P-N junction, and the 3rd term depends on height (h). Equation (1) includes C1, C2, and C3 which are coefficients based on a result of experiment. Accordingly, the method according to Reference 1 also requires large radiation facilities, such as an accelerator, for generating neutrons, as with Japanese Patent Laying-Open No. 2004-125633.

In the present embodiment, the SEB resistance of the semiconductor device is evaluated, using simulation software (a device simulator), without using experimental data.

As the simulation software, well-known software can be used which has a functionality of simulating photo generation within the semiconductor device by a light source, or a functionality of simulating effects of radiation on the semiconductor device. The simulation software is capable of calculating a three-dimensional distribution of electrons and holes which are a single unit of voltage and current, including details of the interior of the model of the semiconductor device, so that the three-dimensional distribution matches conditions of the applied voltage and the current. The simulation software is capable of solving complex simultaneous equations with multiple unknowns, based on a numerical analysis approach.

Figure 1:
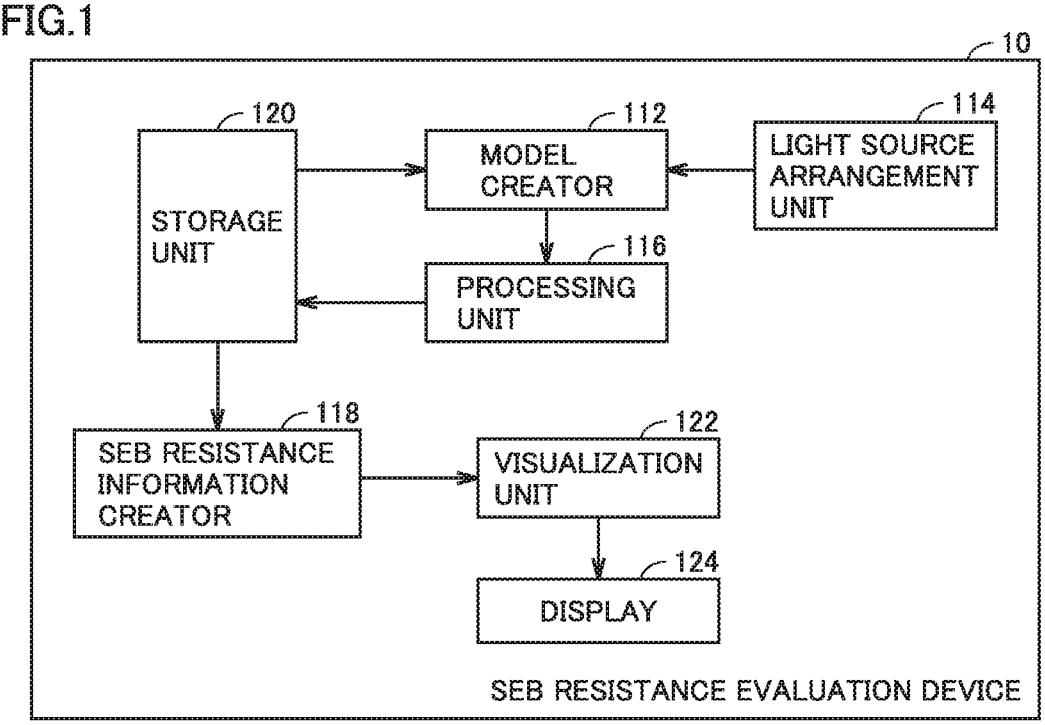
FIG. 1 is a diagram representing a configuration of a SEB resistance evaluation device 10 for a semiconductor device according to an embodiment.

FIG. 1 is a diagram representing a configuration of a SEB resistance evaluation device 10 for a semiconductor device according to an embodiment.

SEB resistance evaluation device 10 includes a model creator 112, a light source arrangement unit 114, a processing unit 116, a SEB resistance information creator 118, a visualization unit 122, a storage unit 120, and a display 124. Model creator 112, light source arrangement unit 114, and processing unit 116 can be implemented by, for example, a computer executing dedicated simulation software (program). SEB resistance information creator 118 and visualization unit 122 can also be implemented by a computer executing programs.

Model creator 112 can create a model of the semiconductor device, based on structural design information of the semiconductor device stored in storage unit 120, and user instructions.

Light source arrangement unit 114 disposes an excitation source within the model of the semiconductor device. In Embodiment 1, the excitation source is disposed at a P-N junction of the model of the semiconductor device at which the electric field strength is maximum within the model.

Processing unit 116 determines an energy of the excitation source at which the semiconductor device exhibits thermal runaway, while varying a voltage applied to the model of the semiconductor device and the energy of the excitation source. More specifically, in Embodiment 1, processing unit 116 determines changes of leakage current $I_K$ between main electrodes of the model of the semiconductor device over time, while varying the voltage applied to the model of the semiconductor device and the energy of the excitation source, and identifies an energy E of the excitation source when leakage current $I_K$ has reached a threshold $I_{TH}$, as an energy $E_{TH}$ of the excitation source at which the semiconductor device exhibits thermal runaway.

SEB resistance information creator 118 creates SEB resistance information representing a correspondence of the applied voltage and failure in time of the semiconductor device.

Storage unit 120 stores the created SEB resistance information, the structural design information of the semiconductor device, etc.

Visualization unit 122 displays a relational expression, a fitted curve, etc. representing the SEB resistance information, on display 124.

Display 124 is, for example, a display device.

Next, a procedure for evaluating the SEB resistance of the semiconductor device will be described. In Embodiment 1, a high-breakdown-voltage vertical PIN diode will be used as one example of the semiconductor device evaluated.

FIG. 2 is a flowchart representing a procedure for evaluating the SEB resistance of the semiconductor device according to Embodiment 1.

In step S101, based on the structural design information of the semiconductor device, user instructions, etc. stored in storage unit 120, model creator 112 creates a model of the semiconductor device to be evaluated.

In step S102, processing unit 116 computes primary breakdown voltage characteristics of the model of the semiconductor device. Processing unit 116 applies a reverse bias voltage between the anode electrode and the cathode electrode of the semiconductor device (diode). Processing unit 116 boosts the reverse bias voltage at regular intervals, and saves to storage unit 120 a solution file describing a physical state of the semiconductor device at multiple reverse bias voltages (applied voltage $V_A$).

In step S103, processing unit 116 selects one unselected solution file from among multiple solution files. Processing unit 116 sets to the model of the semiconductor device a physical state of the semiconductor device at applied voltage $V_A$ described in the selected solution file, and arranges the excitation source at the P-N junction at which the electric field strength is maximum within the model of the semiconductor device. The excitation source is arranged at the location where the electric field strength is maximum because the effects of evaluation of the SEB resistance is small when the neutron collides with the Si atom at the location where the electric field strength is low.

Figure 3A:
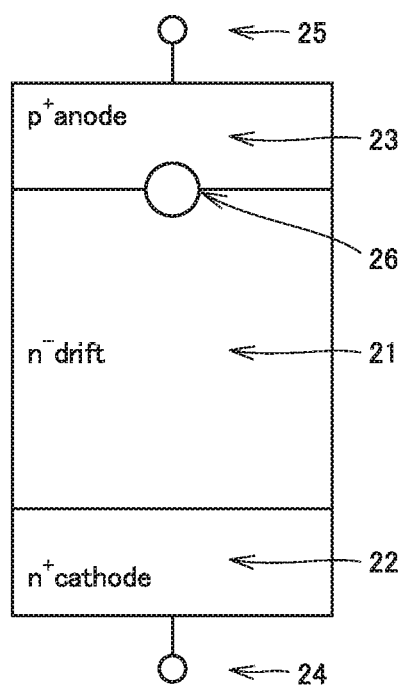
FIG. 3A is a schematic diagram of a model of the semiconductor device in which an excitation source 26 is disposed.
Figure 3B:
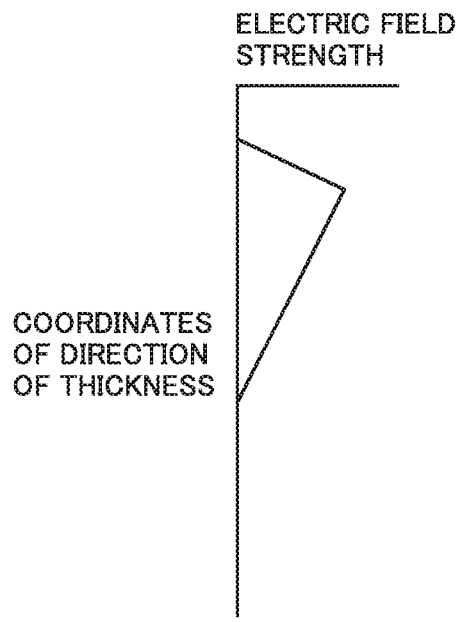
FIG. 3B is a diagram representing the electric field strength within the model of the semiconductor device when an anode electrode and a cathode electrode are reverse biased.

FIG. 3A is a schematic view of the model of the semiconductor device in which the excitation source is disposed. FIG. 3B is a diagram representing the electric field strength within the model of the semiconductor device when the anode electrode and the cathode electrode are reverse biased.

As shown in FIG. 3A, the model of the semiconductor device includes a low concentration n-type drift layer 21 responsible for the electric field distribution to hold the primary breakdown voltage, a high concentration n-type cathode area 22, a high concentration p-type anode area 23, a cathode electrode 24, and an anode electrode 25. An excitation source 26 is arranged at the P-N junction of the model of the semiconductor device.

As a reverse bias voltage is applied between anode electrode 25 and cathode electrode 24, the P-N junction is driven into reverse bias. In other words, p-type anode area 23 has a ground potential (GND) or a negative potential, and n-type cathode area 22 has a high potential relative to p-type anode area 23. FIG. 3B shows the electric field strength of the model of the semiconductor device at this time, represented in coordinates of the direction of thickness of the model of the semiconductor device.

Figure 4:
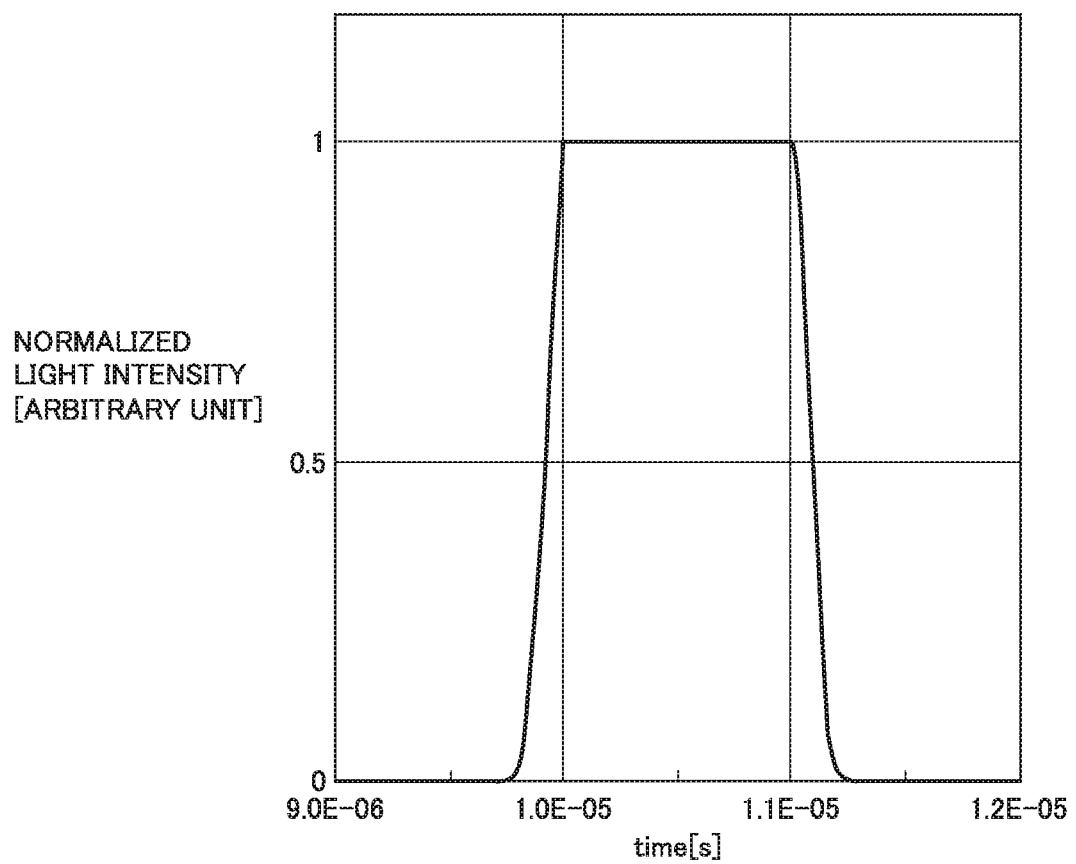
FIG. 4 is a diagram representing an example intensity of excitation source 26.

FIG. 4 is a diagram representing an example intensity of excitation source 26.

As shown in FIG. 4, excitation source 26 emits light having a pulse width of 1 μs. The pulse rises in 0.1 μs. The light emitted by excitation source 26 changes the electric field strength within the semiconductor device, causing temporal and spatial changes of an impact ionization coefficient α. The temporal and spatial changes of impact ionization coefficient α cause temporal and spatial changes of the carrier density generated by the light emitted by excitation source 26, leading to changes in current value.

If generation of electron-hole pairs is caused by the photoexcitation in a region of the semiconductor device which has a relatively high electric field, extra current (flows of electrons and holes) generated by the photoexcitation is superimposed on the leakage current when the anode electrode and the cathode electrode are reverse biased before the excitation. As a result, an increased amount of current is observed at the electrodes of the anode and the cathode of the semiconductor device. The heat generated by the power, which is a product of the increased current and the reverse bias potentials applied to the anode and the cathode, is stored, primarily, within the semiconductor device over time, unless actively cooled. As a result, the temperature inside the semiconductor device increases.

The temperature increase also increases the leakage current when the anode electrode and the cathode electrode are reverse biased, irrespective of the presence or absence of the excitation light. Thus, the semiconductor device is in a positive feedback loop of "an increase of leakage current to an increase of temperature to an increase of leakage current." The phenomenon that the incremental of the leakage current increases over time and the temperature of the semiconductor device becomes out of control, will be called "exhibit thermal runaway," as mentioned above. A typical thermal runaway is a phenomenon that is caused by an increase of the leakage current due to the reverse bias and an increase in temperature of the environment in which the semiconductor device is placed. However, during the SEB phenomenon contemplated in the present embodiment, the photoexcitation induces an increased leakage current that is completely independent of the leakage current caused by the temperature, and an irreversible and uncontrolled increase of the leakage current is uniquely defined by the intensity of the excitation light or the voltage applied to the semiconductor device.

In step S104, processing unit 116 sets energy E of excitation source 26 to the initial value.

In step S105, processing unit 116 determines changes in leakage current $I_K$ between the main electrodes (between anode electrode 25 and cathode electrode 24) of the model of the semiconductor device over time.

Figure 5:
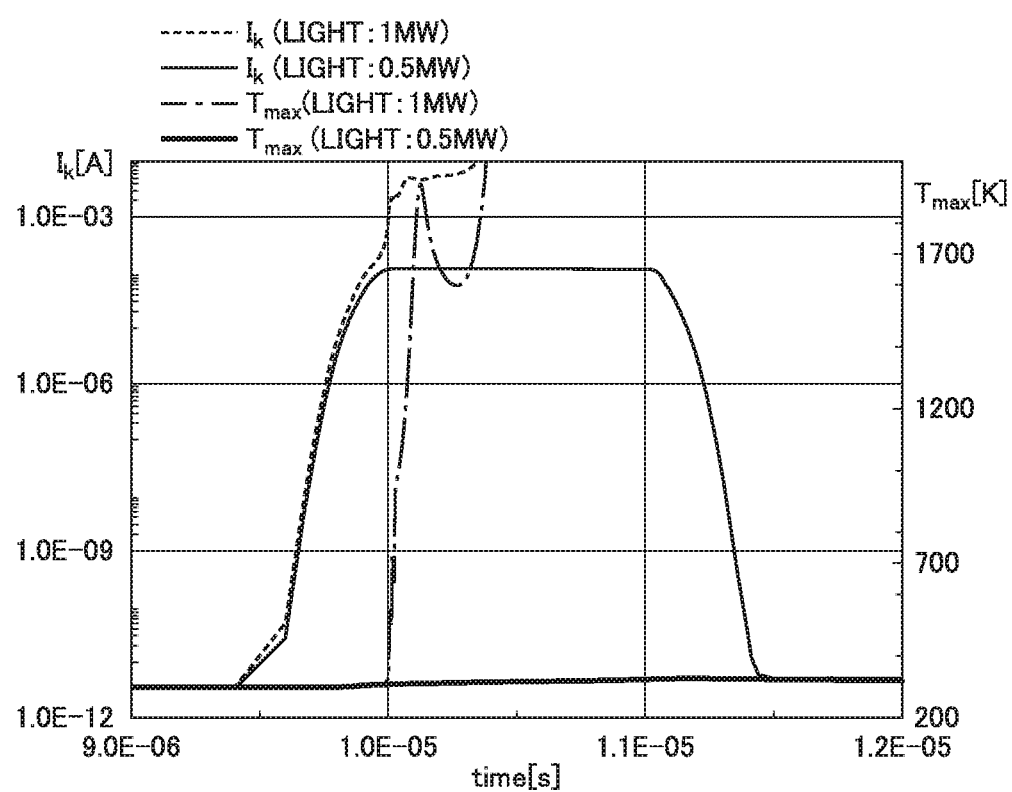
FIG. 5 is a diagram representing one example of the magnitude of a leakage current $I_K$ between the main electrodes of the model of the semiconductor device and changes of the maximum temperature ($T_{max}$) inside the model of the semiconductor device over time, in two types of energy of excitation source 26.

FIG. 5 is a diagram representing one example of the magnitude of leakage current $I_K$ between the main electrodes of the model of the semiconductor device and changes of the maximum temperature inside the model of the semiconductor device over time, in two types of energy of excitation source 26.

FIG. 5 shows changes of leakage current $I_K$ [A] at the cathode electrode and a maximum temperature $T_{max}$ [K] inside the semiconductor device over time, when the applied voltage is 1700V and energy E of excitation source 26 is 0.50 [MW] and 1 [MW].

FIG. 5 shows (i) an example in which leakage current $I_K$ is kept small when an amount of the excitation light in MW is small, resulting in also keeping maximum temperature reached $T_{max}$ low, and (ii) an example in which, when the amount of the excitation light is sufficiently large above $E_{th}$, the semiconductor device enters a positive feedback loop described above, in which the semiconductor device exhibits thermal runaway.

Initially, leakage current $I_K$ will be described. Whether energy E of excitation source 26 is 0.50 [MW] or 1 [MW], leakage current $I_K$ increases by several orders, starting at time 9.5 [μs]. When energy E of excitation source 26 is 0.5 [MW], leakage current $I_K$ stops increasing at time 10 [μs], remains stable, and then returns to the original low level at and after time 11 [μs] at which excitation source 26 is removed from the semiconductor device. On the other hand, when energy E of excitation source 26 is 1 [MW], leakage current $I_K$ continues to increase even at and after time 10 [μs], and still continues to increase at and after time 11 [μs] at which excitation source 26 is removed from the semiconductor device. It is contemplated that, when energy E of excitation source 26 is 1 [MW], the semiconductor device exhibits thermal runaway, as described above, at and after any time. In the present embodiment, when leakage current $I_K$ is greater than or equal to predetermined threshold $I_{TH}$, the semiconductor device is regarded as exhibiting thermal runaway.

Next, maximum temperature $T_{max}$ inside the model of the semiconductor device will be described. When energy E of excitation source 26 is 0.5 [MW], maximum temperature $T_{max}$ increases, starting at time 10 [μs]. However, the increase is extremely small, that is, about tens of degrees Celsius. At and after time 11 [μs] at which excitation source 26 is removed from the semiconductor device, maximum temperature $T_{max}$ returns to the original temperature. On the other hand, when the energy of excitation source 26 is 1[MW], maximum temperature $T_{max}$ has reached 1714K (=1414 degrees Celsius), which is the melting point of Si, at time 10.1 [μs]. When energy E of excitation source 26 is 1[MW], the semiconductor device is regarded as starting exhibiting thermal runaway at and after any time. In another embodiment, when the maximum temperature inside the model of the semiconductor device is greater than or equal to a predetermined threshold $T_{TH}$, the semiconductor device is regarded as exhibiting thermal runaway. Note that the actual semiconductor device is destroyed at a moment $T_{max}$ has reached the melting point (MP) of Si. However, the solid state of the actual semiconductor device is assumed to be maintained on the simulation setting, and the subsequent computation continues. Thus, $T_{max}$ and $I_K$ are obtained as a result of the ongoing computation.

In step S106, if leakage current $I_K$ between the main electrodes is greater than or equal to threshold $I_{TH}$, the process proceeds to step S107. If leakage current $I_K$ between the main electrodes is less than threshold $I_{TH}$, the process proceeds to step S108.

In step S107, processing unit 116 identifies energy E of excitation source 26 at which leakage current $I_K$ between the main electrodes is at threshold $I_{TH}$, as energy $E_{TH}$ of excitation source 26 at which the semiconductor device exhibits thermal runaway.

If the energy of excitation source 26 has not reached a value at which the semiconductor device exhibits thermal runaway in step S108, the process proceeds to step S109, and if the energy of excitation source 26 has reached the value at which the semiconductor device exhibits thermal runaway, the process proceeds to step S110.

In step S109, processing unit 116 increases energy E of excitation source 26 by a certain amount ΔE. Then, the process returns to step S105.

If there is an unselected solution file in step S110, the process returns to step S103. If there is no unselected solution file, the process proceeds to step S111.

Figure 6:
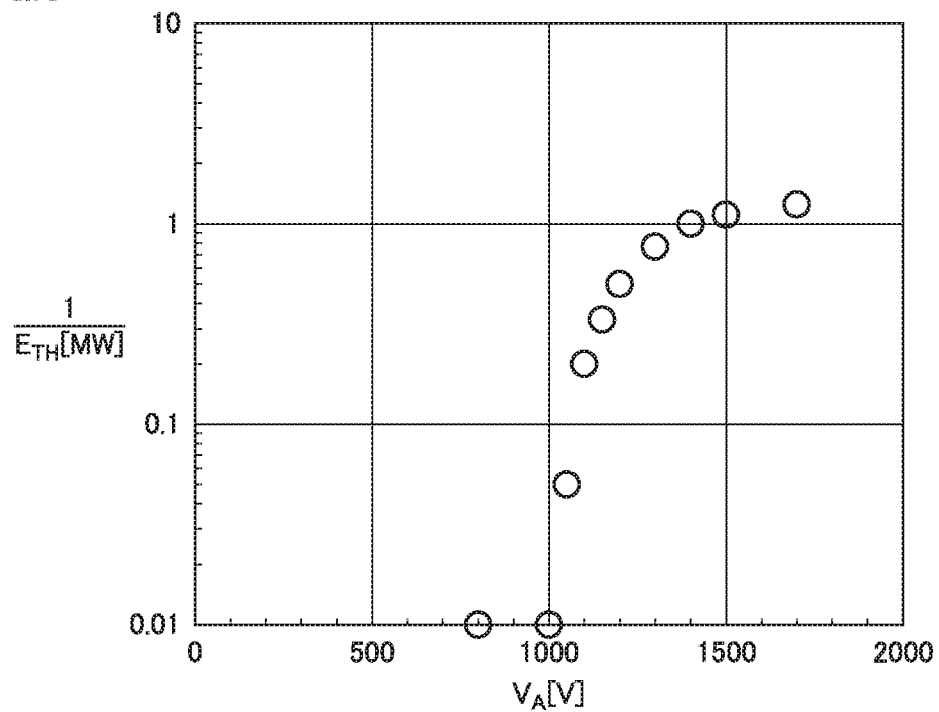
FIG. 6 is a diagram representing a correspondence of an applied voltage $V_A$ and the reciprocal of an energy $E_{TH}$ of excitation source 26 at which the semiconductor device exhibits thermal runaway.

In step S111, SEB resistance information creator 118 creates information representing a correspondence of applied voltage $V_A$ and energy $E_{TH}$ of excitation source 26 at which the semiconductor device exhibits thermal runaway. Visualization unit 122 visualizes and displays the information representing the correspondence created by SEB resistance information creator 118, on display 124. The reciprocal of $E_{TH}$ can be converted into the neutron flying probability, and hence into the failure probability of the semiconductor device. FIG. 6 is a diagram representing a correspondence of applied voltage $V_A$ and the reciprocal of energy $E_{TH}$ of excitation source 26 at which the semiconductor device exhibits thermal runaway.

In step S112, based on Equation (2), SEB resistance information creator 118 determines a differential neutron dose ($d\Phi_0(E)/dE$) corresponding to energy $E_{TH}$ of excitation source 26, at which the semiconductor device exhibits thermal runaway, at each applied voltage $V_A$. Equation (2) is disclosed in Reference 2 (Measurement and Reporting of Alpha Particle and Terrestrial Cosmic Ray-Induced Soft Errors in Semiconductor Devices, JEDEC Standard JESD89A, August 2001). In Equation (2), $E=E_{TH}$.

[MATH 2]

$$\frac{d\Phi_0(E)}{dE} = 1.006 \times 10^{-6} \exp[-0.35(\ln(E))^2 + 2.1451\ln(E)] + 1.011 \times 10^{-3} \exp[-0.4106(\ln(E))^2 - 0.667\ln(E)] \quad (2)$$

Figure 7:
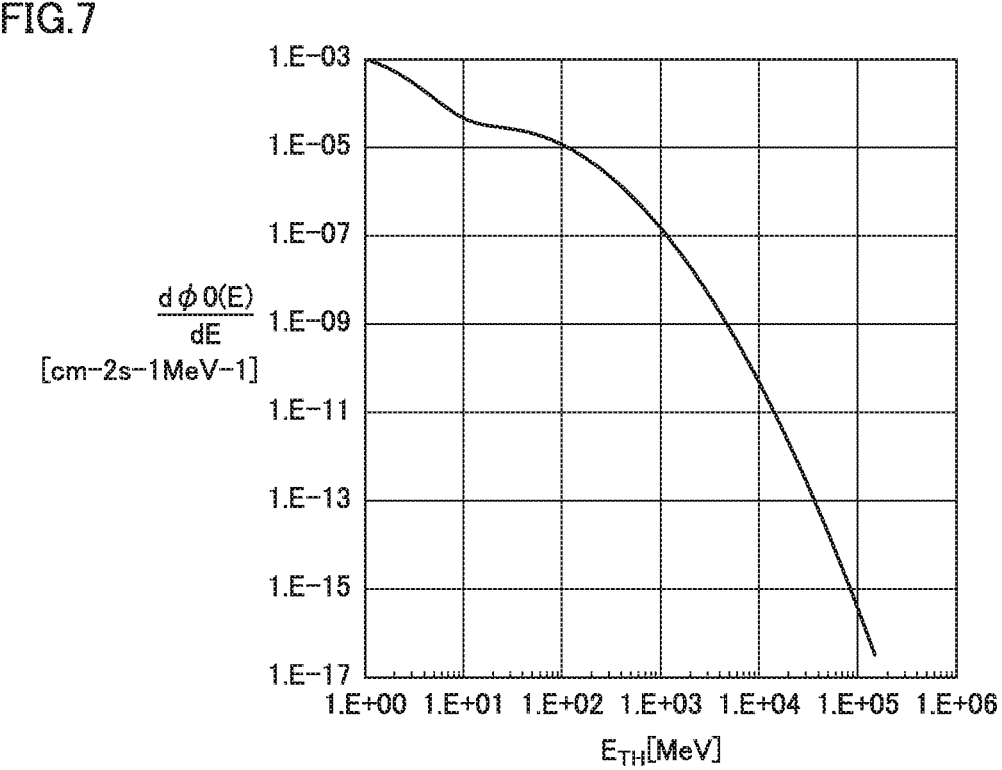
FIG. 7 is a diagram representing energy $E_{TH}$ of excitation source 26 versus a differential neutron dose ($d\Phi_0(E)/dE$), according to Equation (2).

FIG. 7 is a diagram representing energy $E_{TH}$ of excitation source 26 versus a differential neutron dose ($d\Phi_0(E)/dE$), according to Equation (2).

In step S113, regarding the differential neutron dose ($d\Phi_0(E)/dE$), determined in step S112, as the neutron collision probabilities, SEB resistance information creator 118 converts the differential neutron dose ($d\Phi_0(E)/dE$) into failure in time of the semiconductor device per hour, based on Equation (3).

[MATH 3]

$$FIT = \frac{d\Phi_0(E)}{dE} \times 3600 \times 10^{-9} \quad (3)$$

Figure 8:
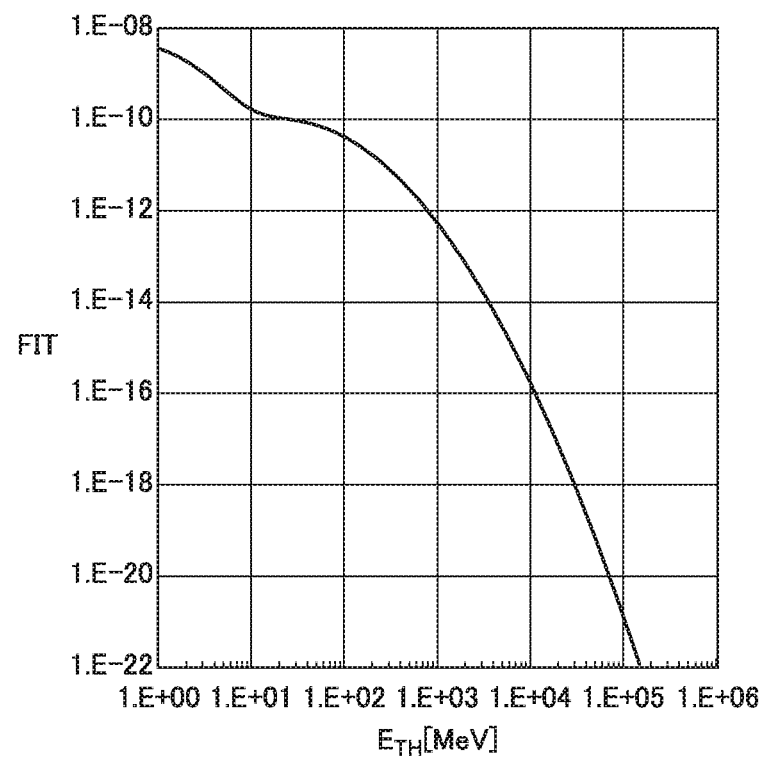
FIG. 8 is a diagram representing energy $E_{TH}$ of excitation source 26 versus failure in time FIT of the semiconductor device per hour, according to Equation (3).

FIG. 8 is a diagram representing energy $E_{TH}$ of excitation source 26 versus failure in time FIT of the semiconductor device per hour, according to Equation (3).

In step S114, based on the relationship between energy $E_{TH}$ of excitation source 26 and failure in time FIT of the semiconductor device per hour obtained in step S113, SEB resistance information creator 118 converts the information, representing the correspondence of applied voltage $V_A$ and energy E of excitation source 26 at which the semiconductor device exhibits thermal runaway into information (hereinafter, SEB resistance information) representing a correspondence of applied voltage $V_A$ and failure in time FIT of the semiconductor device per hour. Visualization unit 122 visualizes and displays the SEB resistance information on display 124.

Figure 9:
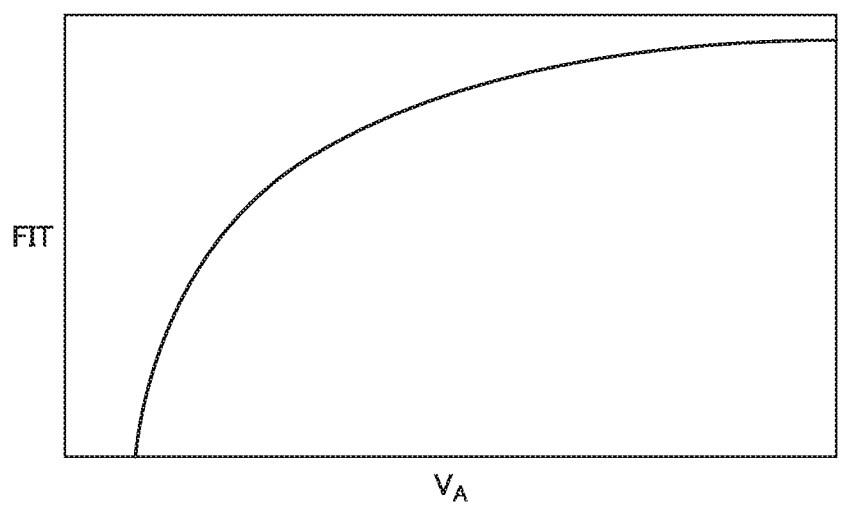
FIG. 9 is a diagram representing one example SEB resistance information.

FIG. 9 is a diagram representing one example SEB resistance information.

As shown in FIG. 9, failure in time FIT of the semiconductor device per hour increases with an increase of applied voltage $V_A$.

Next, description will be given with respect to a reason why the destruction of the semiconductor device by SEB when the semiconductor device is irradiated with neutrons can be determined by confirming an increase of leakage current $I_K$. This is also the basic principle that is used in simulation software programs functioning as model creator 112, light source arrangement unit 114, and processing unit 116.

When the excitation source is disposed at the P-N junction while the reverse bias voltage is being applied between the anode electrode and the cathode electrode of the semiconductor device, leakage current $I_K$ is described in the following set of equations. The following set of equations are disclosed in Reference 3 (S. M. Sze, "Physics of Semiconductor Devices," pp. 754-758, 2nd edition, 1981, A Wiley-Interscience publication).

As indicated in Equation (A1), the leakage current ($I_K$) is the sum of a drift current component ($J_{dr}$) generated within the depletion layer at the P-N junction and a diffusion current component ($J_{diff}$) that is generated in a region remained as a neutral region outside the depletion layer, and flows into a reverse-bias region.

[MATH 4]

$$I_k = J_{dr} + J_{diff} \quad (A1)$$

When the excitation source is disposed at the P-N junction, the incidence G(x) of electron-hole pairs at a distance x from the location of the P-N junction is represented by Equation (A2), where $\Phi_0$ is a photon dose of the excitation source per unit area. Equation (A3) holds true, where R denotes reflectance of the entirety of the semiconductor device (including Si, and not including the aluminum electrode, the back electrode, etc.), A denotes the area of the semiconductor device, and a denotes the impact ionization coefficient. h denotes a Planck constant, ν denotes the frequency of light emitted by the excitation source, and $P_{opt}$ denotes the power of the light emitted by the excitation source. As the light emitted by the excitation source changes temporally, Φ0 changes, which changes G(x).

[MATH 5]

$$G(x) = \Phi_0 \alpha e^{-\alpha x} \quad (A2)$$

$$\Phi_0 = P_{opt}(1-R)/Ah\nu \quad (A3)$$

The drift current component ($J_{dr}$) is given by Equation (A4), where W denotes the width of the depletion layer.

[MATH 6]

$$J_{dr} = -q\int_0^W G(x)dx = q\Phi_0(1 - e^{-\alpha W}) \quad (A4)$$

Given x>W, Equation (A5) holds true, where $D_p$ denotes a hole diffusion coefficient, $\tau_p$ denotes a hole carrier lifetime, $p_n$ denotes a hole density, and $p_{n0}$ denotes a hole density at thermal equilibrium.

[MATH 7]

$$D_p \frac{\partial^2 p_n}{\partial x^2} - \frac{p_n - p_{no}}{\tau_p} + G(x) = 0 \quad (A5)$$

The diffusion length $L_p$ of holes is a square root of hole diffusion coefficient $D_p$ multiplied by hole carrier lifetime $\tau_p$, and is thus represented in Equation (A6). Furthermore, C1 is defined as in Equation (A7). If the boundary conditions ($p_n = p_{n0}$ when x=∞, and $p_n = 0$ when x=W) are set, Equation (A5) is Equation (A8).

[MATH 8]

$$L_p = \sqrt{D_p \tau_p} \quad (A6)$$

$$C_1 \equiv \left(\frac{\Phi_0}{D_p}\right) \frac{\alpha L_p^2}{1 - \alpha^2 L_p^2} \quad (A7)$$

$$p_n = p_{no} - (p_{no} + C_1 e^{-\alpha W})e^{(W-x)/L_n} + C_1 e^{-\alpha x} \quad (A8)$$

The diffusion current component ($J_{diff}$) is given by Equation (A9).

[MATH 9]

$$J_{diff} = q\Phi_0 \frac{\alpha L_p}{1 + \alpha L_p} e^{-\alpha W} + q p_{no} \frac{D_p}{L_p} \quad (A9)$$

Using the boundary conditions of Equation (A10), the leakage current ($I_K$) is represented by Equation (A11).

[MATH 10]

$$J_{diff} = -qD_p(\partial p_n/\partial x)_{x=W} \quad (A10)$$

$$I_k = q\Phi_0\left(1 - \frac{e^{-\alpha W}}{1 + \alpha L_p}\right) + q p_{no} \frac{D_p}{L_p} \quad (A11)$$

$p_{n0}$ on the 2nd term of Equation (A11) is very small, and thus the leakage current ($I_K$) can be fitted by the 1st term only, as in Equation (A12).

[MATH 11]

$$I_k = q\Phi_0\left(1 - \frac{e^{-\alpha W}}{1 + \alpha L_p}\right) \quad (A12)$$

As indicated in Equation (A12), the leakage current ($I_K$) is proportional to photon dose (Do per unit area.

The above set of computations assumes light having low energy, such as visible light. For the neutron having high energy contemplated in the present embodiment, the neutron flux can be replaced with the energy of a single particle (photon).

In step S101 of FIG. 2, the physical property values α, R, A, $D_n$, and $D_p$, used in the above mathematical formulas, can be set, for example, as follows:

Reflectance R is uniquely determined by a material of the semiconductor device. Model creator 112 can select reflectance R from a lookup table by the user designating a material for the semiconductor device.

For example, the user can set the width of the semiconductor device or the width and the depth of the semiconductor device, based on which the model creator 112 can calculate a device area A. Alternatively, the area of the excitation source may be device area A.

Compact ionization coefficient α is uniquely determined by a material of the semiconductor device, a temperature of the semiconductor device, and a voltage applied between the anode electrode and the cathode electrode of the semiconductor device. By the user designating a material of the semiconductor device, model creator 112 can determine impact ionization coefficient α, based on the material of the semiconductor device input, the temperature of the semiconductor device obtained by computations, and the voltage applied between the anode electrode and the cathode electrode of the semiconductor device.

For example, the user designates a material of the n-type drift layer and the doping concentration, thereby allowing model creator 112 to calculate diffusion coefficients $D_n$ and $D_p$.

For example, the user can designate hole carrier lifetime $\tau_p$, and electron carrier lifetime $\tau_n$.

In step S102 of FIG. 2, physical quantities in the applied-voltage $V_A$ dependent mathematical formulas described above are changed by varying the applied voltage $V_A$. For example, impact ionization coefficient α, the integral of x of Equation (A4), etc. are changed.

In step S109 of FIG. 2, varying the energy E of the excitation source corresponds to varying the photon dose $\Phi_0$ of the excitation source per unit area.

In Reference 1, Equation (1) depends on the applied voltage, the temperature of the P-N junction, and the height. In the present embodiment, a is physical quantities related to the applied voltage, and α, $D_p$, $D_n$, $L_p$, and $L_n$ are physical quantities related to the temperature at the P-N junction.

According to the present embodiment, the SEB resistance of the semiconductor device can be evaluated with accuracy through the computer simulation according to the procedure shown in FIG. 2. Accordingly, the SEB resistance can be evaluated in a relatively short time, without using large radiation facilities, such as an accelerator. Moreover, according to the present embodiment, no preparation for sample devices and no equipment necessary for the radiation-related experiment are required, thereby reducing the cost.

A test using sample devices is a destructive test that irradiates the semiconductor device with the neutron during the application of a voltage to the semiconductor device to cause irreparable damage, and, depending on an extent of the irradiation, destruction of the semiconductor device itself is caused. Thus, sample devices are disposable. Furthermore, since the neutrons extracted by an accelerator, etc., have large statistical fluctuations, tens to hundreds of chips of sample devices are needed to enable also the absorption of statistical fluctuations of the applied voltage. Thus, the cost and time for preparing a lot of sample devices are necessary. Moreover, considering stable application of the voltage to the sample devices during the neutron beam irradiation testing period, and transportation of the sample devices to a laboratory facility, the sample devices is incorporated into a power module, rather than being a single semiconductor chip, such as Si. The metal, which is a part of a member of the power module should not be a typically-used heavy metal, such as Cu, and needs to be replaced with a light metal, such as Al, that is hardly activated by irradiation with the neutron beam. Thus, a mass-produced product cannot be diverted, and a special operation needs to be performed on the mass-produced product so that the mass-produced product adapts an embodiment suitable for the SEB resistance experiment. In addition, a meter, etc. which are used in the radiation facilities are also, although very slightly, activated after the experiment, and thus are no longer usable during a decay time. Various procedures associated with such actual measurement are completely eliminated by the computer simulation according to the present embodiment.

Conventionally, having a complex preparation made on a prototype device in preparation for the neutron irradiation, one needs to: obtain permission to use one of a few special radiation facilities existing in the world, take the experiment equipment, such as a power supply capable of applying of a high voltage, etc., into the facility, and carry out the experiment within a limited time. In the present embodiment, the device simulator is used, which gives freedom to change the structure of the semiconductor device. Since details of the structure of the semiconductor device can be reviewed during the development phase so that the product has SEB resistance for the use environment and purpose of the product. This significantly improves the development efficiency.

For the computing procedure also, a heavy-ion model, incorporated in a device simulator, is conventionally used. In this model, heavy particles pass through a solid device, while mechanically destroying the atomic arrangement of the constituent atoms, such as Si, across tens of micrometers to hundreds of micrometers. In this model, the passing area is unable to hold the electric field, which requires a complex computation for allowing the passing area to pass the overload to the surrounding atomic regions. Therefore, a conventional model requires an increased computation time and an increased necessary storage capacity, also assumes, although it is locally, crystallographic destruction caused by the incident particle. Thus, the conventional model is not suitable for the calculation of the failure probability. In contrast, the failure probability can be calculated in the present embodiment.

The specific procedure of computer simulation according to the present embodiment is as described above. In other words, the process of varying the intensity of light each time by a suitable step size within a pre-set range of the light intensity to examine the light-intensity dependence with respect to changes in leakage current and maximum temperature over time, is repeated while varying a voltage applied to a model of a semiconductor device. This can be performed just by the basic functionalities of the device simulator, that is, the computation of the excitation of electron-hole pairs in a high electric field region caused by photoelectric effects and changes in its associated carrier multiplication phenomenon over time. Thus, the SEB resistance can be evaluated in a relatively short time, without requiring a large storage capacity.

Accordingly, in the present embodiment, the entire work can also be programed to proceed automatically. The computer simulation, even unmanned, can be advanced efficiently, using nighttime and holidays.

Moreover, since there is a regulation for the experiment using radiation facilities that one needs to receive a proper professional education and pass a qualifying exam that is conducted for each serving facility in order to be involved in the radiation work, it is practically difficult for a developer of the semiconductor device to conduct such experiment. The computer simulation according to the present embodiment is free of such a regulation and thus a developer himself/herself, with basic operational knowledge of the device simulator, can select and set various device structures and conditions for the experiment. This allows enhanced developer's expertise and improved efficiency of the entire development.

Embodiment 2

In the present embodiment, a processing unit 116 determines changes in maximum temperature $T_{max}$ inside a model of a semiconductor device over time, while varying the voltage applied to the model of the semiconductor device and the energy of an excitation source, to identify energy E of the excitation source when the maximum temperature has reached threshold $T_{TH}$, as energy $E_{TH}$ of the excitation source at which the semiconductor device causes an irreversible phenomenon. Processing unit 116 can determine maximum temperature $T_{max}$ inside the model of the semiconductor device by temporally and spatially computing the conductions of the temperature inside the model of the semiconductor device.

Figure 10:
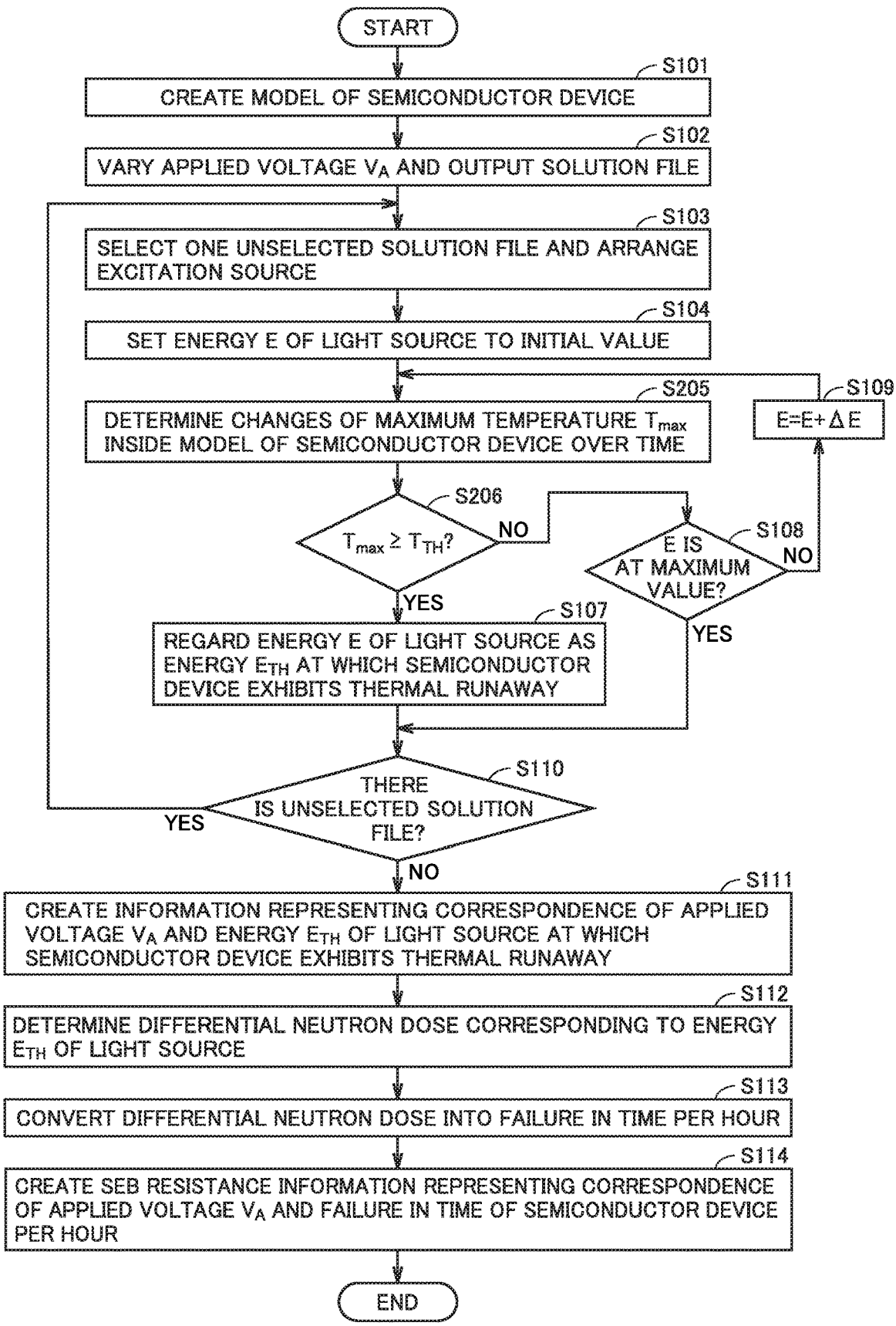
FIG. 10 is a flowchart representing a procedure for evaluating the SEB resistance of a semiconductor device according to Embodiment 2.

FIG. 10 is a flowchart representing a procedure for evaluating the SEB resistance of the semiconductor device according to Embodiment 2. The flowchart of FIG. 10 is the same as the flowchart of FIG. 2, except for including steps S205 and S206, instead of steps S105 and S106.

In step S205, processing unit 116 determines changes of maximum temperature $T_{max}$ inside the model of the semiconductor device over time.

If maximum temperature $T_{max}$ is greater than or equal to threshold $T_{TH}$ in step S206, the process proceeds to step S107. If maximum temperature $T_{max}$ is less than threshold $T_{TH}$, the process proceeds to step S108.

Embodiment 3

In the present embodiment, a semiconductor device evaluated for SEB resistance is different from Embodiments 1 and 2.

A semiconductor device according to the present embodiment includes a n-type drift layer 21 having a thickness less than n-type drift layer 21 included in the semiconductor device according to Embodiment 1 by about ten percent. In the present embodiment, due to n-type drift layer 21 being thin, the range of coordinates of the direction of thickness of the model of the semiconductor device in which the electric field strength is positive is smaller than that shown in FIG.

3B, and the maximum value of the electric field strength is greater than that shown in FIG. 3B.

The SEB resistance of the semiconductor device is evaluated in a manner similar to Embodiment 1.

Figure 11:
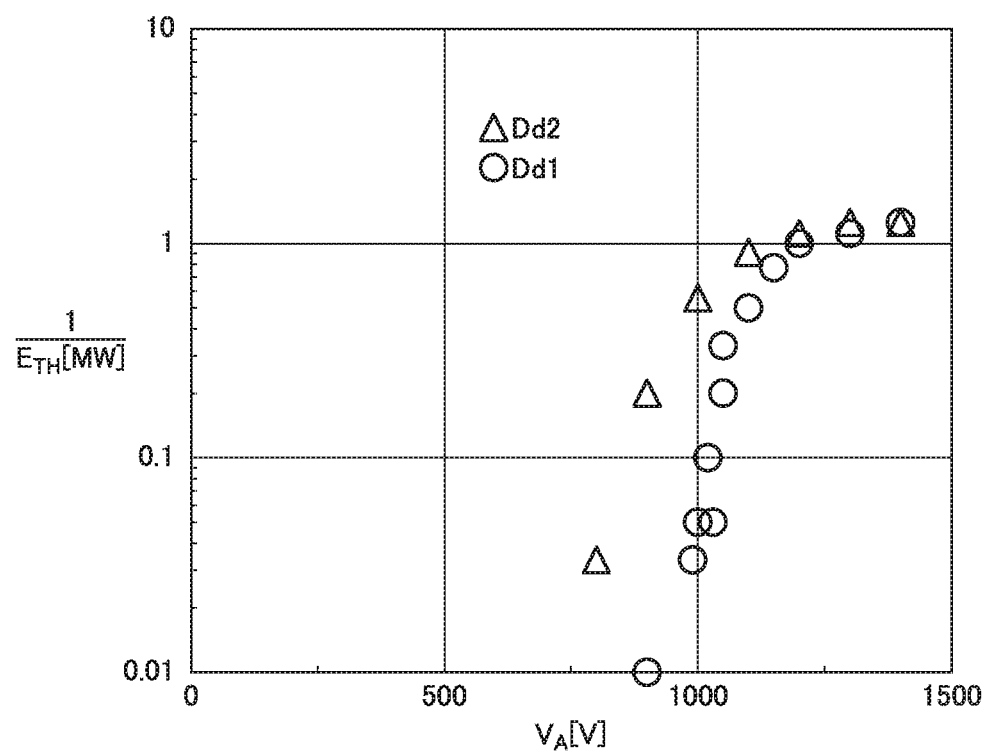
FIG. 11 is a diagram representing a correspondence of applied voltage $V_A$ and the reciprocal of energy $E_{TH}$ of the excitation source at which a semiconductor device Dd1 according to Embodiment 1 exhibits thermal runaway, and a correspondence of applied voltage $V_A$ and the reciprocal of energy $E_{TH}$ of the excitation source at which a semiconductor device Dd2 according to Embodiment 3 exhibits thermal runaway.

FIG. 11 is a diagram representing a correspondence of applied voltage $V_A$ and the reciprocal of energy $E_{TH}$ of the excitation source at which a semiconductor device Dd1 according to Embodiment 1 exhibits thermal runaway, and a correspondence of applied voltage $V_A$ and the reciprocal of energy $E_{TH}$ of the excitation source at which a semiconductor device Dd2 according to Embodiment 3 exhibits thermal runaway.

As shown in FIG. 11, energy E of the excitation source at which the semiconductor device exhibits thermal runaway in Embodiment 3 is less than Embodiment 1.

Embodiment 4

In the present embodiment, a semiconductor device evaluated for SEB resistance is more complex than Embodiments 1 to 3.

Figure 12:
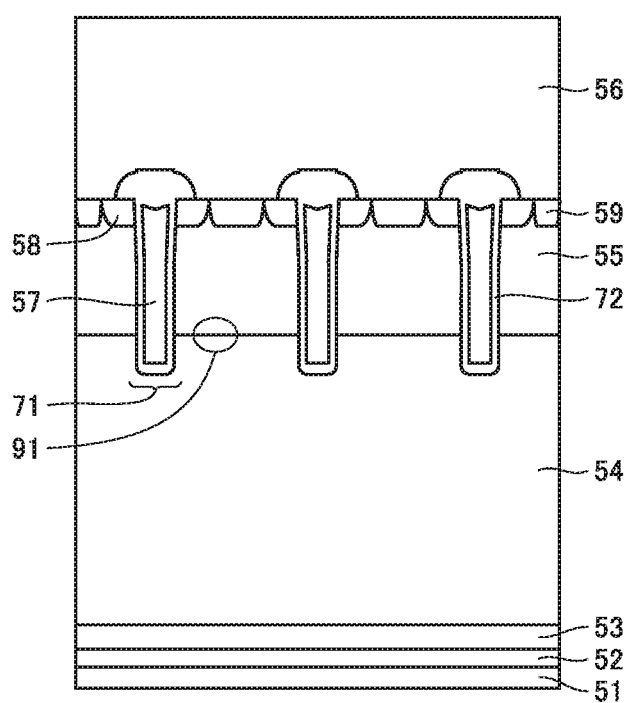
FIG. 12 is a diagram representing a model of a semiconductor device according to Embodiment 4.

FIG. 12 is a diagram representing a model of a semiconductor device according to Embodiment 4.

FIG. 12 shows a model of an IGBT having a trench gate structure.

This model includes a n-type drift layer 54, a n-type buffer layer 53, a p-type collector layer 52, a collector electrode 51, a p-type base layer 55, a n-type emitter layer 58, a p-type layer 59 having a higher concentration than base layer 55, an emitter electrode 56, trenches 71 each having a gate polysilicon interconnect 57 embedded therein, and gate oxides 72.

The electric field distribution of a trench gate IGBT is complex. Thus, an excitation source 91 is disposed near a P-N junction in the present embodiment.

In the case of the cross-sectional structure shown in FIG. 12, although, at first glance, the maximum electric field strength may be estimated to be at the bottom of trench 71, the model of the IGBT is designed to prevent it. For example, the model of the IGBT is designed to include trenches 71 projecting less from p-type base layer 55 so that a depletion layer extending from the P-N junction can cover trenches 71 as much as possible even with a low reverse bias voltage.

In the present embodiment, excitation source 91 is disposed near the P-N junction, thereby allowing the evaluation of the SEB resistance of the semiconductor device.

Furthermore, the SEB resistance can be evaluated by disposing the excitation source not only at the location (near the P-N junction) where the electric field strength is maximum, but also at various locations (such as the bottom of trench 71) concerned by a developer. For example, effects of the interaction of carriers between the location (near the P-N junction) where the electric field strength is maximum and the location (such as the bottom of trench 71) where the electric field strength is at a local maximum, may be examined.

Embodiment 5

The method of evaluation of the SEB resistance described in Embodiment 1 is applicable not only to the cell portion that energizes and causes switching operation of the transistors, such as diodes, IGBT, and MOSFET, but also to peripheral portions of the semiconductor chip. Examples of the peripheral portions include termination structures, such as a guard ring, a field limiting ring (FLR), and variation of lateral dropping (VLD), a gate pad, and a gate interconnect. This allows comprehensive evaluation of the SEB resistance of the semiconductor chip, based on weakness of the semiconductor chip and the percentage occupied by the weakness.

Figure 13:
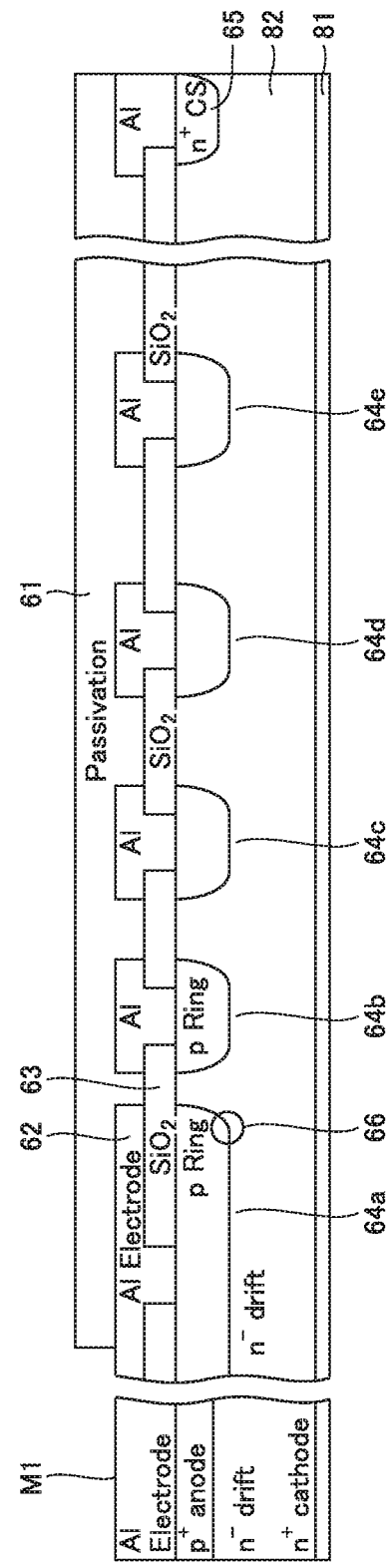
FIG. 13 is a diagram representing a model of a structure of a termination portion of a semiconductor chip which includes field limiting rings (FLR) according to Embodiment 5.
Figure 14:
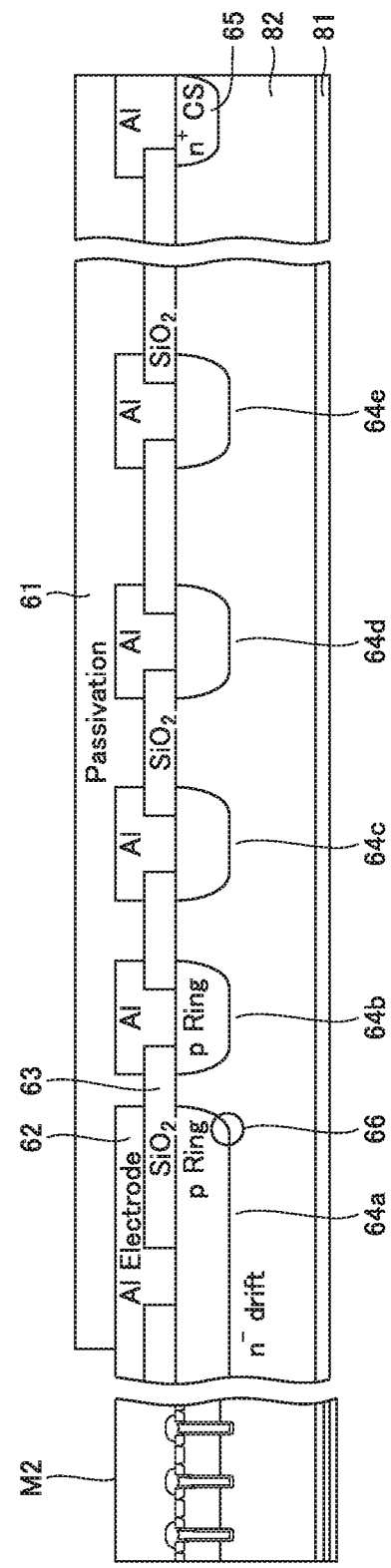
FIG. 14 is a diagram representing the model of the structure of the termination portion of the semiconductor chip which includes the FLRs according to Embodiment 5.

FIGS. 13 and 14 are diagrams representing a model of a structure of a termination portion of the semiconductor chip which includes the FLRs according to Embodiment 5.

For example, given a PIN diode, an n-type drift layer 82 is disposed on an n-type semiconductor substrate 81. In order to loosen the electric field strength, p-type FLRs 64a, 64b, 64c, 64d, 64e are disposed on n-type drift layer 82. Thick insulating film 63 comprised of $SiO_2$, and an anode electrode 62 are disposed on FLRs 64a, 64b, 64c, 64d, 64e.

An end portion of the semiconductor chip, such as Si, cut off by dicing or the like, is disposed on the right hand side of the semiconductor chip. An n-type channel stopper 65 is formed. A positive high potential is applied to channel stopper 65 when a high voltage is applied to the end portion, as with the structure of n-type cathode area 22 on the back surface of the semiconductor chip.

A cell which performs primary operations is disposed on the left hand side of the semiconductor chip. In FIG. 13, a model M1 of the high-breakdown-voltage vertical PIN diode, described in Embodiment 1, is disposed on the left hand side. In FIG. 14, a model M2 of the IGBT having the trench gate structure described in Embodiment 4 is disposed on the left hand side. A negative potential or a ground potential is applied to anode electrode 62 of the PIN diode cell portion and emitter electrode 56 of the IGBT cell portion to hold a high voltage.

As shown in FIGS. 13 and 14, an excitation source 66 is disposed at the joint of FLR 64a and n-type drift layer 82.

Figure 15:
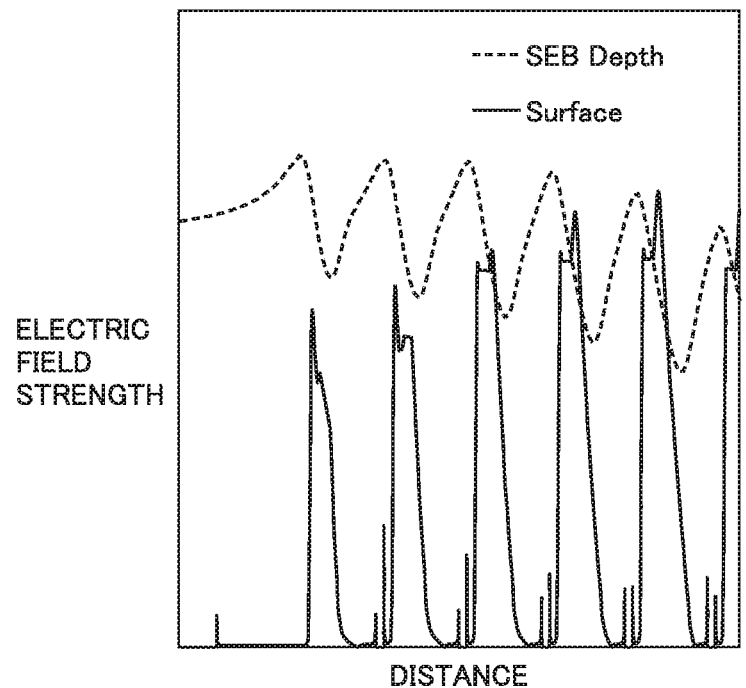
FIG. 15 is a diagram representing a result of simulation of electric field distribution when a high voltage is applied to the termination portion of the semiconductor chip which has FLRs similar to the FLRs of FIGS. 13 and 14.

FIG. 15 is a diagram representing a result of simulation of the electric field distribution when a high voltage is applied to the termination portion of the semiconductor chip which has FLRs similar to the FLRs of FIGS. 13 and 14.

In FIG. 15, the curve, labeled Surface, represents the electric field distribution at an interface between n-type drift layer 82 and thick insulating film 63. The curve, labeled SEB Depth, represents the electric field distribution of the semiconductor chip in the horizontal direction at the depth at which the bottoms of FLR 64a, 64b, 64c, 64d, 64e are located.

The electric field distribution of a simple termination structure, which only has a p-type anode area, etc., on the left hand side and a n-type drift region on the right hand side, has a horizontal distribution in which the electric field on the left hand side is low and the electric field on the right hand side is high. However, by disposing FLRs having a multi-ring structure, the electric field distribution does not exhibit a simple triangle distribution as shown in FIG. 3B. The electric field distribution has a shape in which inverted V-shapes close to a triangle are dispersed in the region of n-type drift layer 82 between adjacent FLRs. The semiconductor chip is designed so that these inverted V-shapes are lower than the maximum electric field strength of the cell portion.

Furthermore, from the standpoints of ease-of-use and reliability of the product, the semiconductor chip is designed so that the interface portion, which is the outermost surface of a semiconductor material, such as Si, does not have a maximum electric field strength, and the electric field strength is at maximum at some depth of the semiconductor chip. Moreover, due to such a complex structure, the semiconductor chip has an increased design freedom and is more sensitive to variations in manufacturing process. Thus, which one of FLRs 64a, 64b, 64c, 64d, 64e at which the electric field strength is maximum is not necessarily, uniquely determined. It is very beneficial to extract such a termination portion and compute the SEB resistance as described in Embodiment 1 to evaluate structural weak points and effects of manufacturing variations.

Variation

The present disclosure is not limited to the embodiments described above, and encompasses, for example, a variation as follows.

(1) Arrangement of Excitation Source

The arrangement of the excitation source in step S103 of FIGS. 2 and 10 may be performed when the model of the semiconductor device is created in step S101.

(2) Calculation on the Desk

The processes of steps S111 through S114 of FIGS. 2 and 10 may be considered as being performed by user calculation on the desk. For example, the intensity of light and the neutron collision probabilities can be converted by the user using spreadsheet software.

(3) Hardware Configuration

Figure 16:
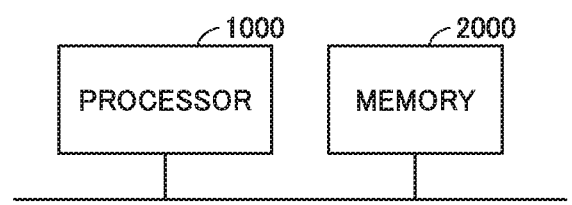
FIG. 16 is a diagram showing a structure of a SEB resistance evaluation device 10 when the functionality of SEB resistance evaluation device 10 is implemented using software.

The operations of the SEB resistance evaluation device according to Embodiments 1 to 5 can be configured in hardware components, such as digital circuits or in software. If the functionalities of the SEB resistance evaluation device are implemented in software, for example, the SEB resistance evaluation device can include a processor 1000 and a memory 2000, as shown in FIG. 16, and processor 1000 can execute programs stored in memory 2000.

(4) While Embodiment 1 has been described with reference to the semiconductor device being a high-breakdown-voltage vertical PIN diode, the present disclosure is not limited thereto. The semiconductor device may be a PN diode. If the semiconductor device is a unipolar device, such as SiC or GaN, the unipolar device may be a high-breakdown-voltage vertical diode, such as a Schottky diode.

(5) While Embodiment 4 has been described with reference to the semiconductor device being an IGBT having a trench gate structure, the present disclosure is not limited thereto. The semiconductor device may be a switching element, such as IGBT, MOSFET (Metal Oxide Semiconductor Field Effect Transistor), a junction FET, a bipolar transistor, or a thyristor.

(6) While Embodiment 5 has been described with reference to the peripheral portions being FLRs, the present disclosure is not limited thereto. The peripheral portion may be the termination structure portion such as FLR, or a gate pad or a gate interconnect region.

(7) Embodiments 1, 4, and 5 have been described with reference to a vertical device in which the main electrodes, to which a high voltage is applied or through which a large current is passed, are disposed on the upper surface and the lower surface of the device. However, the present disclosure is not limited thereto. The device may be a horizontal device in which the main electrodes are disposed on the upper surface, spaced apart from each other. A specific example includes a composite horizontal device, such as a HVIC (High Voltage IC) whose range of operating voltage is from hundreds of volts to several kilovolts, while it has a structure similar to a general LSI.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A SEB resistance evaluation method for evaluating single event burnout (SEB) resistance of a semiconductor device by computer simulation, the method comprising:
   disposing an excitation source within a model of the semiconductor device; and
   determining an energy of the excitation source at which the semiconductor device exhibits thermal runaway, while varying an applied voltage to the model of the semiconductor device and the energy of the excitation source.

2. The SEB resistance evaluation method according to claim 1, wherein
   determining the energy of the excitation source includes:
   determining changes of a leakage current between main electrodes of the model of the semiconductor device over time, while varying the applied voltage to the model of the semiconductor device and the energy of the excitation source; and
   identifying an energy of the excitation source when the leakage current has reached a threshold, as the energy at which the semiconductor device exhibits thermal runaway.

3. The SEB resistance evaluation method according to claim 2, further comprising
   generating information representing a correspondence of the applied voltage and the energy of the excitation source at which the semiconductor device exhibits thermal runaway.

4. The SEB resistance evaluation method according to claim 3, further comprising:
   converting the energy of the excitation source at which the semiconductor device exhibits thermal runaway into a differential flux of neutrons;
   converting the differential flux into failure in time of the semiconductor device; and
   converting the correspondence of the applied voltage and the energy of the excitation source into a correspondence of the applied voltage and the failure in time.

5. The SEB resistance evaluation method according to claim 4, further comprising
   displaying a curve representing the correspondence of the applied voltage and the failure in time.

6. The SEB resistance evaluation method according to claim 1, wherein
   determining the energy of the excitation source includes:
   determining changes of a maximum temperature inside the model of the semiconductor device over time, while varying the applied voltage to the model of the semiconductor device and the energy of the excitation source; and
   identifying an energy of the excitation source when the maximum temperature has reached a threshold, as the energy at which the semiconductor device exhibits thermal runaway.

7. The SEB resistance evaluation method according to claim 6, further comprising
   generating information representing a correspondence of the applied voltage and the energy of the excitation source at which the semiconductor device exhibits thermal runaway.

8. The SEB resistance evaluation method according to claim 1, wherein
   disposing the excitation source within the model of the semiconductor device includes disposing the excitation source at a P-N junction of the model of the semiconductor device.

9. The SEB resistance evaluation method according to claim 1, wherein
the semiconductor device is a high-breakdown-voltage vertical diode.

10. The SEB resistance evaluation method according to claim 1, wherein
the semiconductor device is a switching element.

11. The SEB resistance evaluation method according to claim 1, wherein
the semiconductor device includes a termination structure portion or a peripheral portion.

12. A SEB resistance evaluation device for evaluating single event burnout (SEB) resistance of a semiconductor device by computer simulation, the device comprising:
a processor to execute a program; and
a memory to store the program which, when executed by the processor, performs processes of,
disposing an excitation source within a model of the semiconductor device; and
determining an energy of the excitation source at which the semiconductor device exhibits thermal runaway, while varying an applied voltage to the model of the semiconductor device and the energy of the excitation source.

* * * * *